US009196242B1

(12) United States Patent
Master et al.

(10) Patent No.: US 9,196,242 B1
(45) Date of Patent: Nov. 24, 2015

(54) SYSTEM AND METHODS FOR OFFLINE AUDIO RECOGNITION

(75) Inventors: Aaron Master, Palo Alto, CA (US); Bernard Mont-Reynaud, Sunnyvale, CA (US); Keyvan Mohajer, Los Gatos, CA (US)

(73) Assignee: SoundHound, Inc., Santa Clara, CA (US)

( * ) Notice: Subject to any disclaimer, the term of this patent is extended or adjusted under 35 U.S.C. 154(b) by 418 days.

(21) Appl. No.: 13/482,792

(22) Filed: May 29, 2012

(51) Int. Cl.
*G06F 17/30* (2006.01)
*G10L 15/08* (2006.01)

(52) U.S. Cl.
CPC ...................................... *G10L 15/08* (2013.01)

(58) Field of Classification Search
CPC ............... G06F 17/30743; G06F 17/30864; G06F 17/30749; G06F 17/30648; G06F 17/30017; G06F 17/30758; G06F 17/30817; G06F 17/30026; G06F 17/30038; G06F 17/30746; G06F 17/30755; G06F 17/30787; G06F 17/30867; G06F 17/30979; G06F 17/30; G06F 17/30967; G06F 17/30554; G06F 17/30861; G06F 17/30312; G06F 17/30424; G06F 17/30321; G06F 17/30613; G06F 3/167; G06F 17/30058; G06F 17/3005; G06F 17/30386; Y10S 707/99933; G10L 15/22; G10L 15/00; G10L 17/22; G10L 2015/223; G10L 15/02; G10L 15/26; G10L 15/265; G10L 15/08

USPC .................................................. 707/769, 768
See application file for complete search history.

(56) References Cited

U.S. PATENT DOCUMENTS

| | | | |
|---|---|---|---|
| 5,974,409 A * | 10/1999 | Sanu et al. ............................. 1/1 |
| 2006/0003753 A1 * | 1/2006 | Baxter, Jr. .................. 455/414.3 |
| 2008/0190272 A1 * | 8/2008 | Taub et al. ....................... 84/645 |
| 2008/0215557 A1 * | 9/2008 | Ramer et al. ....................... 707/4 |
| 2008/0281787 A1 * | 11/2008 | Arponen et al. ................... 707/3 |
| 2008/0301125 A1 * | 12/2008 | Alves et al. ......................... 707/5 |
| 2010/0017366 A1 * | 1/2010 | Robertson et al. ................. 707/3 |
| 2011/0078172 A1 * | 3/2011 | LaJoie et al. .................. 707/769 |
| 2011/0116719 A1 * | 5/2011 | Bilobrov ......................... 382/217 |
| 2011/0247042 A1 * | 10/2011 | Mallinson ......................... 725/86 |
| 2012/0047156 A1 * | 2/2012 | Jarvinen et al. ............... 707/758 |

* cited by examiner

*Primary Examiner* — Jean B Fleurantin
*Assistant Examiner* — Evan Aspinwall (57) ABSTRACT

In one implementation, a method is described of retrying matching of an audio query against audio references. The method includes receiving a follow-up query that requests a retry at matching a previously submitted audio query. In some implementations, this follow-up query is received without any recognition hint that suggests how to retry matching. The follow-up query includes the audio query or a reference to the audio query to be used in the retry. The method further includes retrying matching the audio query using retry matching resources that include an expanded group of audio references, identifying at least one match and transmitting a report of the match. Optionally, the method includes storing data that correlates the follow-up query, the audio query or the reference to the audio query, and the match after retrying.

12 Claims, 4 Drawing Sheets

SYSTEM AND METHODS FOR OFFLINE AUDIO RECOGNITION

BACKGROUND

The technology disclosed relates to audio recognition. In particular, it relates to retrying matching of an audio query to audio references.

Matching audio queries to audio references is imperfect. In noisy conditions, during peak query periods, and in other circumstances, audio recognition servers may not return any matching reference or may return a candidate matching reference that is mistaken, which does not match the audio query.

Users find it frustrating when an audio query is not recognized or an incorrect result is returned. The user's typical recourse is to record a new audio query from ambient sound, if the song is still playing, and to submit the additional sample in the hope of finding a passage that the audio recognition server will identify.

SUMMARY

In one implementation, a method is described of retrying matching of an audio query against audio references. The method includes receiving a follow-up query that requests a retry at matching a previously submitted audio query. In some implementations, this follow-up query is received without any recognition hint that suggests how to retry matching. The follow-up query includes the audio query or a reference to the audio query to be used in the retry. In some implementations, the method further includes retrying matching the audio query using retry matching resources that include an expanded group of audio references, identifying at least one match and transmitting a report of the match. Optionally, the method includes correlation storing data regarding the follow-up query.

The technology disclosed improves user experience, following the attempted recognition of audio queries, in case a user was not happy with the results of a search. By accepting user feedback, the method may result (for the user) in an improved acceptance of audio matching technology, and (for the recognition system) in an improved precision or recall. Using feedback, the system can correct associations and provide better coverage of the desired audio references. In addition, a follow-up system may inform the user who gave feedback that a certain issue has been fixed. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Crowd sourcing is a distributed problem-solving and production process that involves outsourcing tasks, typically through a network to people known as the crowd. In audio sampling recognition, crowd sourcing can be applied to providing feedback about failed audio recognition, both in instances when no match to an audio query is returned and when one or more candidate matches are returned, but they are mistaken. Users are expected to sometimes provide feedback that indicates their belief that an audio query should have been recognizable, that suggests the corresponding audio reference should be promoted to a primary group of reference samples, or that includes a recognition hint. These various types of feedback may be provided with a request to retry matching of an audio query.

Responding to a user retry request includes acknowledging the request and retrying matching of the audio query. The acknowledgement may be immediate, within the user's immediate attention span, within 1, 3, 5 or 10 seconds. The retrying may be deferred. Deferring the retry may move the retry from a peak resource demand period to an off peak period. Or, it may put the retry request into a queue to be handled in due course.

Retrying matching may include using reserve resources and matching the audio query against a larger group of audio references that is searched less frequently than a smaller group of audio references that is searched more frequently.

Figure 1:
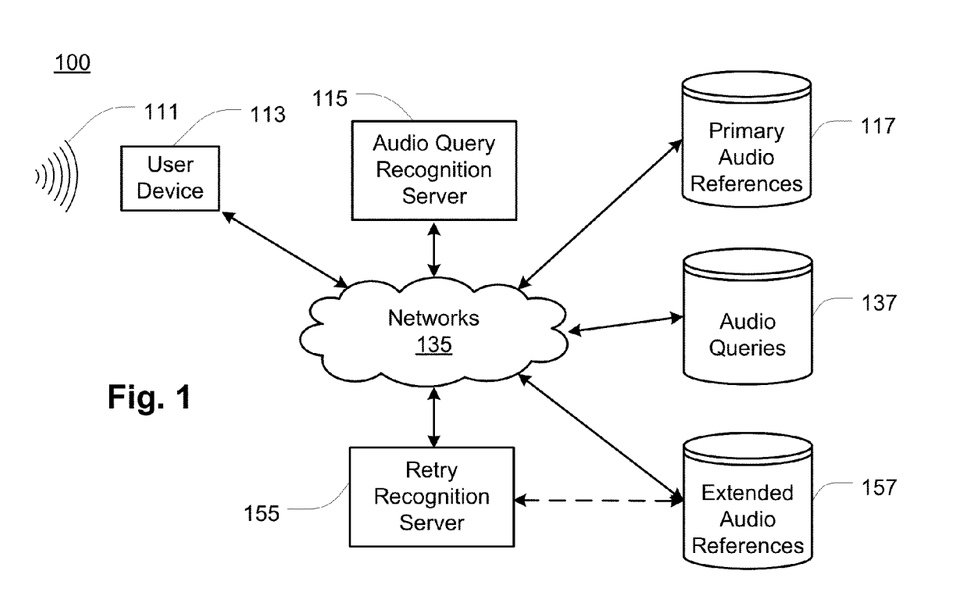
FIG. 1 in an example of an environment in which the technology disclosed can be practiced.

FIG. 1 illustrates a block diagram of an example environment 100 in which audio query recognition feedback can be used. The environment 100 includes the user device 113 that formulate an audio query. For instance, the user device 113 may capture ambient sound 111 from the radio or music playing in a café. Either a captured sample or extracted features or fingerprints can be transmitted as an audio query. The environment 100 includes one or more communication networks 135 that allow for communication between various components of the environment 100.

In one implementation, the network 135 includes the Internet. The network 135 can utilize dedicated or private communication links that are not necessarily part of the Internet. In one implementation, the network 135 uses standard communication technologies, protocols, and/or interprocess communication technologies.

The user device 113 has interfaces for trying, for retrying, and for receiving follow-up recognition of audio queries. This interface allows the user to capture the audio query and submit for recognition. Following unsuccessful recognition of the audio query, the interface allows the user to request retrying of matching the audio query, optionally including supplemental information that may assist in matching. User device 113 may be for example a desktop computer, laptop, tablet computer, mobile phone, or any other type of computing device.

The audio query recognition server 115 receives an audio query and searches primary audio references 117 for a match. The recognition server 115 may use recognition technologies such as those described in prior applications also assigned to SoundHound or it may use other conventional or newly developed technologies for audio query recognition.

In some implementations, audio queries are stored in a log or database 137. A history may be associated with a user or user device and stored by the audio query recognition server 115 on the server side or stored locally by the user device 113.

The retry recognition server 155 receives a retry request and the audio query or a reference to the audio query, such as a query code number. The audio query may be received if the history of audio queries is retained by the user device 113. A reference to the audio query may be resolved in the audio query retrieved from the audio queries database or log 137 if the history is retained on the server side of the networks 135. In practice, the retry recognition server 155 may be implemented as a group or cluster of servers. A tiered architecture of front end, application and database servers may be used to implement the retry recognition server. A cluster or server farm may be used.

The retry recognition server 155 optionally may receive a recognition hint that can be used to assist in matching the audio query to an extended group of audio references 157. The retry recognition server 155 may respond to retry requests in real-time, while a user's attention remains focused on the user device 113 interface, or it may defer or queue retry requests for processing as resources on the server become available. In one implementation, the processing of retrying requests in real time while a user's attention remains focused on the user device 113 interface can be performed for a fee from the user. In an alternate implementation, the process of deferring or queuing of retry requests for processing at a time later when more resources are available on the server can be performed for free.

In an alternate implementation, in the event that the audio query recognition server 115 is unsuccessful in finding a match to the audio query, the audio query recognition server can automatically generate and queue a retry request or a plurality of retry requests that are processed by the retry recognition server 155. The retry request can be queued such that the retry request is processed by the retry recognition server 155 after the passing of a specific amount of time since the audio query recognition server 115 was first unsuccessful in finding a match to the audio query. For example, the retry request or plurality of retry requests can be queued such that a retry request is processed by the retry recognition server every day after the query recognition server was first unsuccessful in finding a match to the audio query. Alternatively, the retry request can be generated by the audio query recognition server and queued such that the retry request is processed by the retry recognition server after the updating of either or both of the primary audio references 117 and the extended audio references 157. The retry recognition server, as discussed previously, can retrieve the initial audio query from the audio queries database or log 137 and then search either or both of the primary audio references 117 and the extended audio references 157. Alternatively, upon receiving the retry request that is generated automatically by the system, the retry recognition server 155, can retrieve the initial audio query and a stored recognition hint, and then search either or both of the primary audio references 117 and the extended audio references 157. The queued retry request or plurality of retry requests can be removed from the queue after the retry recognition server correctly matches the initial audio query to an audio reference and sends the correctly matched audio reference to the user device 113. As a result, the user experience is improved as the user is sent correctly matched audio references without having to constantly input retry requests.

The extended audio references 157 may include variations on the primary audio references 117 and may include audio references not found among the primary audio references. The extended audio references 157 further may include one or more private audio reference libraries with limited accessibility and application. The extended audio references 157 may or may not include the primary audio references 117. While FIG. 1 depicts just two sets of primary 117 and extended 157 audio references, three or more groups of references may be constructed. The scope of audio references searched may depend on a combination of factors. Broader groups of references may be progressively searched, responsive to user requests and subject to resource availability.

Figure 2:
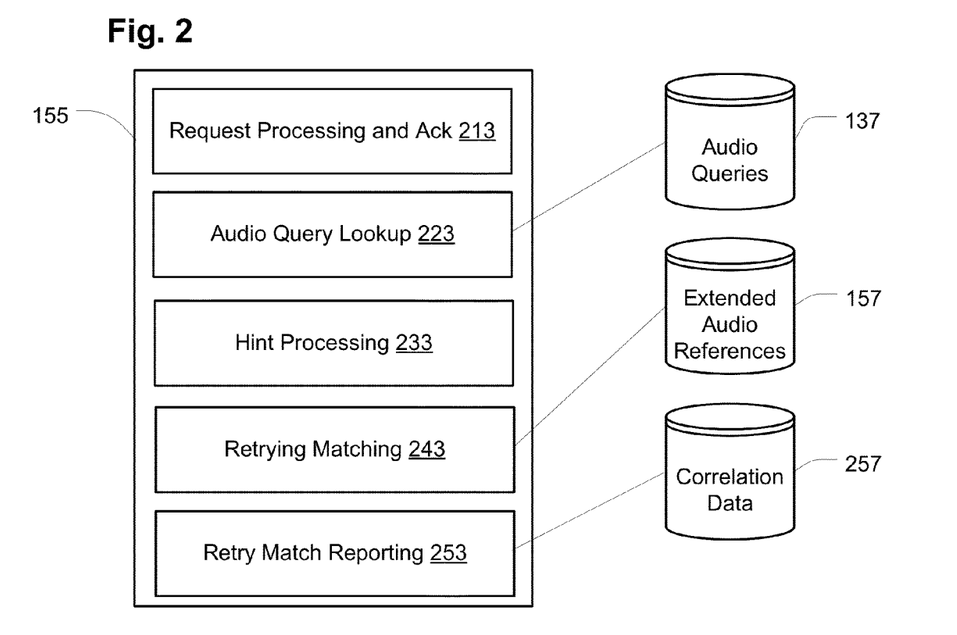
FIG. 2 is an example block diagram of server-side technology that responds to audio matching retry requests.

FIG. 2 is an example block diagram of server-side technology that responds to audio matching retry requests. The retry recognition server 115 may include or invoke one or more the following modules or components. When practiced as a device or system, the modules or components include software, firmware or other program logic operating on suitable hardware. The modules or components indicated may be combined into units or even a monolithic program. The modules or components may be implemented on shared hardware. The modules or components may be subdivided and distributed into separate routines running on shared or distributed hardware. When practiced as an article of manufacture, the modules or components include software, firmware or other program logic stored on a machine readable storage medium, including a solid state memory (volatile or non-volatile; e.g., RAM, SSD, ROM, FPGA or flash memory) or a rotating memory (e.g., a hard disk, CD or DVD.)

A request processing and acknowledgment module or component 213 receives incoming retry requests. It optionally acknowledges audio matching retry requests. An audio query lookup module or component 223 processes retry requests that are accompanied by a reference to an audio query. The audio query lookup module retrieves the referenced audio query from a logger database of audio queries 137. This component is optional, especially when the user device retains its own history of audio queries. A hint processing module component 233 processes recognition hints that accompany a retry request. Incoming hints are converted into a format that can be used when retrying matching. This component is optional, especially when it is optional for the user device to provide any recognition hint. A retrying of matching module or component 243 handles matching of an audio query to audio references in an extended group of audio references 157. A retry match reporting module or component 253 reports successful results from retry matching 243. This component also may persist in a log or database 257, data that correlates components of the retry request, including the audio query or a reference to the audio query, recognition hint, if any, and the reported match.

Figure 3:
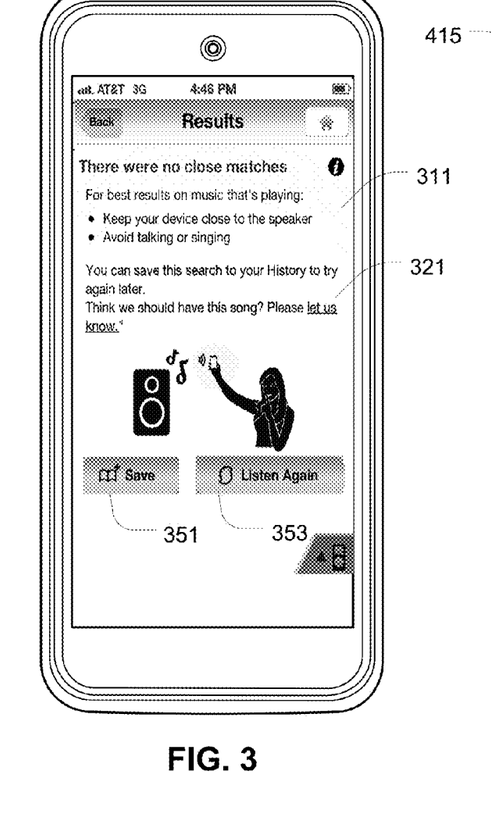
FIGS. 3-4 are example client-side interfaces for audio matching retry requests.
Figure 4:
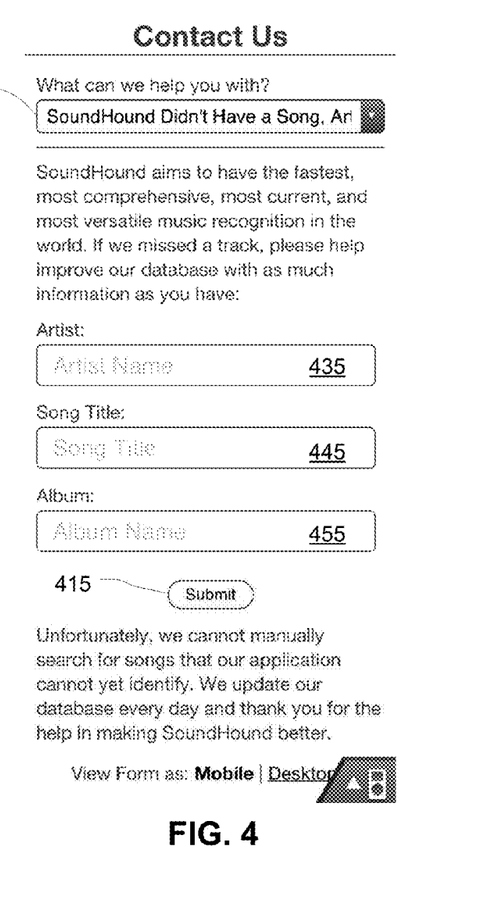

FIGS. 3-4 are example client-side interfaces for audio matching retry requests. FIG. 3 illustrates an example of an interface that reports failure to match an audio query to an audio reference. This interface includes an explanation 311 for certain common types of failures, and a link 321 that invites the user to submit information about the audio query to the recognition system. The interface also includes options for the user to save an audio query 351 or to resample 353 the sound and submit the new sample.

FIG. 4 shows an interface that includes several sections that may or may not be shown depending on the selection of the help desired 415. Different selections 415 may be offered. For the help selection illustrated, that the recognition system did not have the desired song, the interface will provide the user with opportunities to supply "hints"—information about a song that the user wants have recognized. The user who reaches this interface after receiving an incorrect match may help to correct a mistaken identification of an audio query with feedback information that may be partial or complete. For example, the user may provide part or all of the artist name 435, song title 445 or album name 455. Once the user has finished inputting hint data into the interface, submission can be confirmed by pressing a button 485.

Figure 5:
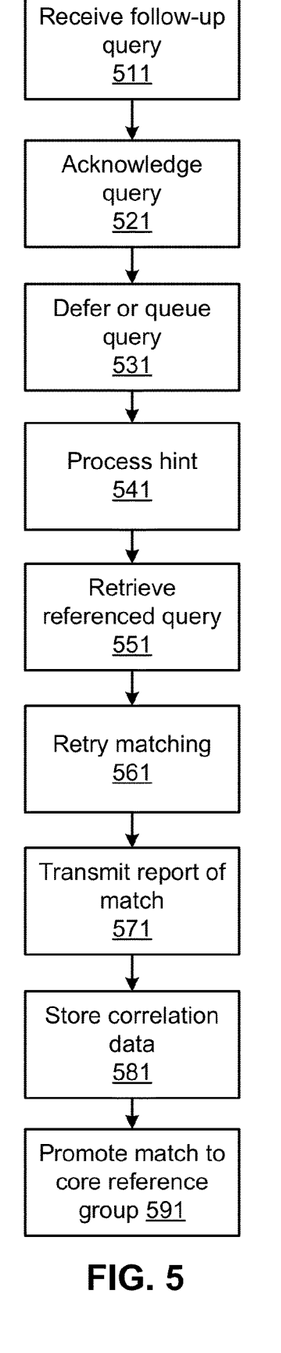
FIGS. 5-6 are example flow charts of server-side technology that respond to audio matching retry requests and to initial audio matching requests.
Figure 6:
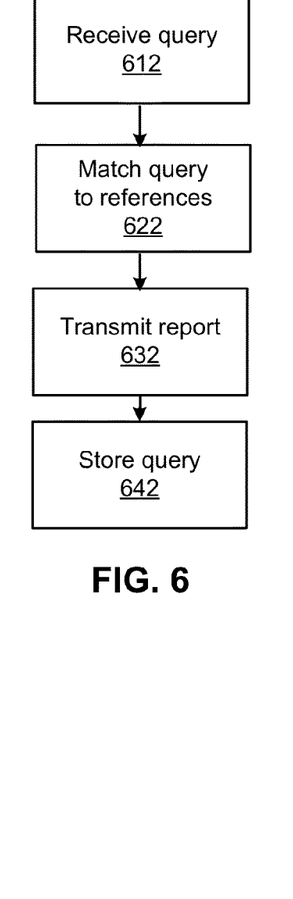

FIGS. 5-6 are example flow charts for server-side processes that respond to audio matching retry requests and to initial audio matching requests. Other embodiments may perform the steps in different orders and/or perform different or additional steps than the ones illustrated in the flow charts herein. For convenience, FIGS. 5-6 will be described with reference to the system of one or more computers that perform the process.

FIG. 5 identifies many actions that may be practiced together or in various groupings. It is not necessary to practice all of the actions together; it is expected that server-side processes will be configured in some implementations with half or fewer of the actions illustrated. The system receives a follow-up query 511, for instance a query generated using the interface depicted in FIG. 4. This follow-up query is accompanied by an audio query or a reference to an audio query. Optionally, the system acknowledges the follow-up query 521. The acknowledgment may be more or less immediate, within a time that a user would be expected to remain focused on a user device interface used to make the request. This time may be within one, 1, 3 or 10 seconds or another relatively brief time. The system may process a follow-up query immediately or it may defer or queue the query 531 for later processing. The later processing may occur during off-peak time for recognition resources demand; it may occur when the follow-up query reaches the front of the queue or at some other scheduled time.

When the follow-up request is accompanied by a recognition, the system processes the recognition hint 541. This hint may include complete or partial information about an artist, composer, song title, or album describing the audio query being processed. The information may be correct or misspelled. Misspellings and partial information can be handled using a variety of conventional techniques. The recognition hint is processed 541 into an internal format such as a data object they can be used to assist in identifying the audio query.

When the follow-up request is accompanied by a reference to an audio query, the system retrieves the referenced sample 551. The reference to the audio query may be direct, such as a unique identifier, or indirect, such as a fuzzy description of a sample taken last week in San Jose. When the description is fuzzy, additional steps not depicted in FIG. 5 may be taken to interact with the user device to uniquely identify the audio query that is the subject of the follow-up query.

The system retries matching the audio query 561 against an extended group of audio references. Retrying the audio recognition may involve applying technology previously described in applications by this assignee or it may involve application of conventional or newly developed recognition technologies.

In this example, the matching succeeds and at least one match is returned. The match identifies an audio reference that is considered to match the audio query. Data returned with the match may include artist, composer, song title, album, album cover artwork, year, etc. The system transmits a report of the match 571 to the user device that made the follow-up request, to an intermediate network component, or to a device in chain of communication, or to a predetermined destination.

Optionally, the system stores correlation data 581 that includes the follow-up request, the audio query or a reference to the audio query, and the match. This correlation data may be stored in the longer database. It may be available for later analysis and processing. For instance, later analysis and processing may result in the system promoting the match 591 from the extended audio references group 157 to the primary audio references group 117. More generally, later processing may cause the matching audio reference to be promoted from a larger group of audio references that is searched less frequently to a smaller group of audio references that is searched more frequently. Later analysis and processing may more generally treat the follow-up request as an indication of popularity of the audio reference matched. This will increase the popularity score of the audio reference matched, which may be used for any a variety of purposes.

FIG. 6 is an example of processes that may precede a follow-up request. For convenience, the preceding processes 612-642 are described with reference to the system. An audio query recognition server 115 receives an initial audio recognition querying 612 for processing. It attempts to match the audio query to a group of primary audio references 117. It transmits the report 632 towards the user device that generated the query. This report may identify a match or, as depicted in FIG. 3, it may report that no close matches were found. The system optionally stores the audio query received with the query 642. It may return to the user device 113 for later use a unique identifier of the audio query stored. It also may save metadata related to the audio query, such as the time the sample was collected and the location of the user device at the time of collection.

Figure 7:
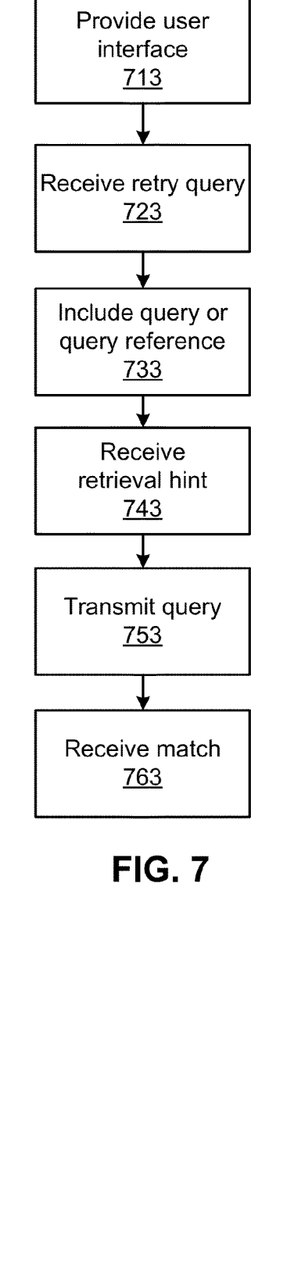
FIG. 7 is an example flow chart of client-side technology that makes audio matching retry requests.

FIG. 7 is an example flow chart of client-side technology that makes audio matching retry request. For convenience, the process 713-763 is described with respect to a user device 113 or other system that generates queries. The system provides a user interface 713 for hardware to process and render as a user display, such as the interface depicted in FIG. 4. The system receives a follow-up or retry query 723 from a user interacting with the interface. The system packages the follow-up query with an audio query or reference to an audio query 733. Optionally and not shown in the figure, the system provides one or more interfaces that support user lookup of a particular audio query that will be the subject of the follow-up query.

In some implementations, the reference to the audio query may be a fuzzy reference, such as an indication that the sample was taken at a particular time or in a time period at a particular location. Other fuzzy references to an audio query also may be processed. When fuzzy references are used, additional steps of interaction among the user, the user device and/or the retry recognition server may be required to resolve the fuzziness and identify the particular audio query that is the subject of the follow-up query. Optionally, the system receives a retrieval hint 743. The system transmits the query 753, including a retry request, the audio query or a reference to the audio query and a recognition hint, if any, to the retry recognition server.

Figure 8:
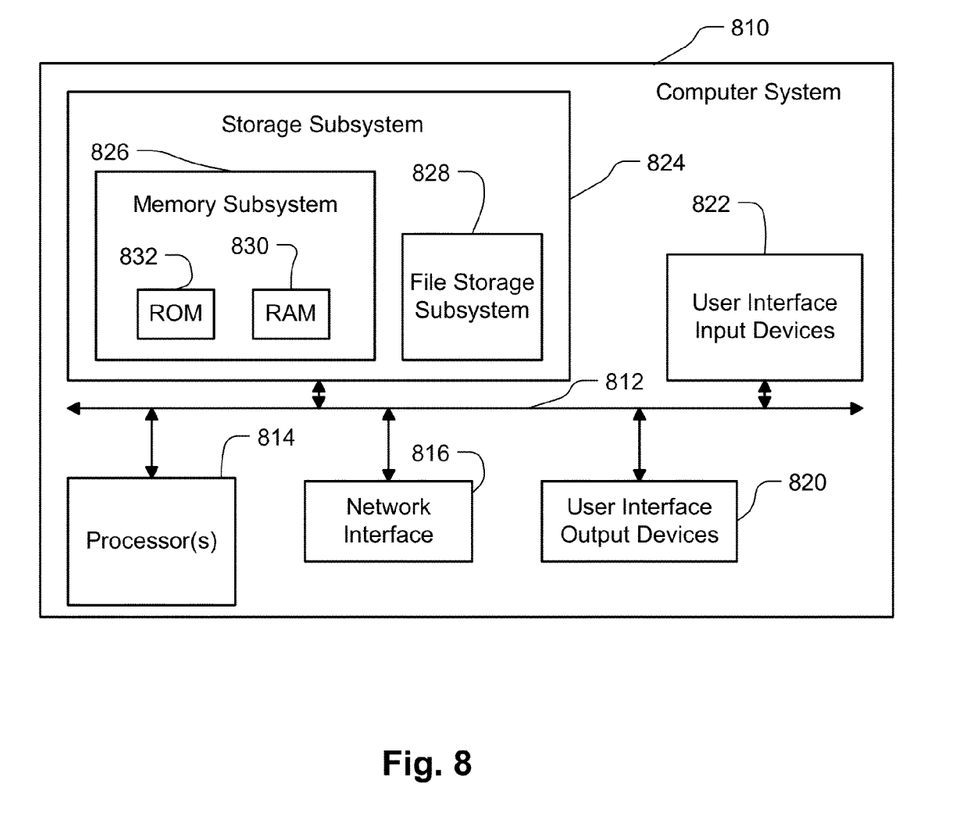
FIG. 8 is an example computer device that can be used to implement computer-based technology.

FIG. 8 is a block diagram of an example computer system. Computer system 810 typically includes at least one processor 814, which communicates with a number of peripheral devices via bus subsystem 812. These peripheral devices may include a storage subsystem 824, comprising for example memory devices and a file storage subsystem, user interface input devices 822, user interface output devices 820, and a network interface subsystem 816. The input and output devices allow user interaction with computer system 810. Network interface subsystem 816 provides an interface to outside networks, including an interface to communication network 140, and is coupled via communication network 140 to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 810 or onto communication network 140.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein, including the logic to identify metadata within a document that is suitable for use as query suggestions according to the processes described herein. These software modules are generally executed by processor 814 alone or in combination with other processors.

Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 828 in the storage subsystem 824, or in other machines accessible by the processor.

Bus subsystem 812 provides a mechanism for letting the various components and subsystems of computer system 810 communicate with each other as intended. Although bus subsystem 812 is shown schematically as a single bus, alternative embodiments of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating the preferred embodiments. Many other configurations of computer system 810 are possible having more or fewer components than the computer system depicted in FIG. 8.

Particular Implementations

The present invention may be practiced as a method or device adapted to practice the method. The same method can be viewed from the perspective of a retry recognition server or a user device that generates follow-up or retry requests. The invention may be an article of manufacture, such as computer readable storage impressed with logic to carry out computer-assisted retry recognition.

In one implementation, a method is described of retrying matching of an audio query against audio references. The method includes receiving a follow-up query that requests a retry at matching a previously submitted audio query. In some implementations, this follow-up query is received without any recognition hint that suggests how to retry matching. The follow-up query includes the audio query or a reference to the audio query to be used in the retry. The method further includes retrying matching the audio query using retry matching resources that include an expanded group of audio references, identifying at least one match and transmitting a report of the match. Optionally, the method includes storing data that correlates the follow-up query, the audio query or the reference to the audio query, and the match after retrying.

This method and other implementations of the technology disclosed could each optionally include one or more of the following features.

The retry query may be promptly acknowledged.

The action of retrying the matching may be deferred from a time of receiving the follow-up query to a time of reduced query load or queued deferred of processing the retrying of the matching.

The method may be extended by, responsive at least in part to the stored correlation data, promoting the match to the audio query from the expanded group of audio references to a primary group of audio references.

Other implementations may include a non-transitory computer readable storage medium storing instructions executable by a processor to perform a method as described above. Yet another implementation may include a system including memory and one or more processors operable to execute instructions, stored in the memory, to perform a method as described above. In yet another implementation, the method can include queuing a retry request after an initial audio query is not matched, and applying the receiving and retrying steps to the queued retry request. The queued retry request can be processed from the queue based upon a period of time after which the initial audio query is not matched. Alternatively, the queued retry request can be processed from the queue based upon the completion of an update of the expanded group of audio references. In another implementation the step of retrying matching the audio query using retry matching resources can occur in real-time.

Another implementation describes a method of retrying matching of an audio query against audio references that includes receiving a follow-up query that requests a retry at matching a previously submitted audio query with a recognition hint that suggests how to retry matching. As above, the follow-up query includes the audio query or a reference to the audio query that is the subject of the follow-up. The method further includes retrying matching the audio query using the recognition hint and retry matching resources that include an expanded group of audio references, identifying at least one match and transmitting a report of the match. The method optionally includes storing data that correlates at least the follow-up query, the audio query or the reference to the audio query, and the match after retrying.

Receiving the follow-up query may be preceded by receiving an initial query including the audio query, attempting to match the audio query using primary matching resources; and transmitting a report of no match found. The transmitting the report action may include a report of one or more candidate matches that do not correctly identify the audio query. When a recognition hint is received in the method above, it may be a hint that rejects the candidate matches.

Responsive to a recognition hint, the method may further include increasing a popularity score of the match. The increased popularity score may indicate that the match should be part of a core group of audio references.

The recognition hint may be an indication that the audio query is from an obscure reference. For obscure references, matching the audio query may be expanded to an expanded group of audio references that includes obscure references.

The recognition hint may be a partial indication of what audio reference the audio query should match, including one or more of artist, composer, title, lyrics, or genre. This partial indication of what reference the audio query should match may be used when the retrying of the matching.

The recognition hint may be a sample of background noise.

The recognition hint may be an indication that the matching should be performed against a private group of audio references. Responsive to a private group hint, matching the audio query may involve a private group of audio references.

In yet another implementation, the method can include queuing a retry request that includes the recognition hint after an initial audio query is not matched, and applying the receiving and retrying steps to the queued retry request. The queued retry request can be processed from the queue based upon a period of time after which the initial audio query is not matched. Alternatively, the queued retry request can be processed from the queue based upon the completion of an update of the expanded group of audio references. In another implementation the step of retrying matching the audio query using retry matching resources can occur in real-time.

Another method implementation of retrying matching of an audio query against audio references includes receiving a query that requests a matching an audio query with an identifier that indicates a private library of audio references to query, wherein the query includes the audio query or a reference to the audio query. This method further involves matching the audio query using the private library and matching resources that include an expanded group of audio references, identifying at least one match and transmitting a report of the match. Optionally, this method includes storing data that correlates at least the follow-up query, the audio query or the reference to the audio query, and the match after retrying.

Any of the features described in the preceding methods may be combined with the method in the immediately preceding paragraph.

Another perspective on the technology disclosed is a method of retrying matching of an audio query against audio references. One implementation method includes providing a user interface that accepts a follow-up query that requests a retry at matching a previously submitted audio query with a recognition hint that suggests how to retry matching and receiving a follow-up query and recognition hint from the user interface. This method further includes transmitting the follow-up query and recognition hint to a recognition server, wherein the follow-up query includes the audio query or a reference to the audio query, receiving an acknowledgement of the follow-up query. After a delay period, the method includes receiving a report of a match to the follow-up query. The delay period may be 5 minutes or more. Alternatively, it may be longer than the time in which a user continues to interact with the user interface provided that accepted the follow-up query.

Another implementation method includes an interface module initiating a follow-up query to an audio matching server, the follow-up query including the audio query or a reference to the audio query and a recognition hint; and receiving from the audio matching server a report of at least one potential match to the audio query, responsive to the recognition hint.

To remind the reader, other implementations of any of the foregoing methods may include a non-transitory computer readable storage medium storing instructions executable by a processor to perform a method as described above. Yet another implementation may include a system including memory and one or more processors operable to execute instructions, stored in the memory, to perform a method as described above.

We claim as follows:

1. A method of retrying matching of an initial audio query against audio references, the method including:
   receiving a follow-up query from a user that requests a retry at matching an initial audio query, the initial audio query comprising a recorded audio sample or audio fingerprints derived from the recorded audio sample, the follow-up query including:
   the initial audio query previously submitted by the user or a reference to the initial audio query previously submitted by the user; and
   a recognition hint from the user that suggests how to retry matching;
   queuing a retry request comprising the follow-up query after an initial audio query is not matched;
   processing the queued retry request from the queue based upon one of:
   a period of time after which the initial audio query is not matched; or
   the completion of an update of the expanded group of audio references;
   wherein processing the queued retry request includes retrying matching the initial audio query using the recognition hint and retrying matching resources that include an expanded group of audio references;
   identifying at least one match for the retry request and transmitting a report of the match; and
   storing data that correlates at least the follow-up query, the initial audio query or the reference to the initial audio query, and the match after retrying.

2. The method of claim 1, further including, before receiving the follow-up query:
   receiving an initial query including the audio query:
   attempting to match the audio query using primary matching resources; and
   transmitting a report of no match found.

3. The method of claim 1, further including, before receiving the follow-up query:
   receiving the audio query:
   attempting to match the audio query using primary matching resources; and
   transmitting a report of one or more candidate matches, wherein the candidate matches do not correctly identify the audio query;
   wherein the recognition hint includes rejection of the candidate matches.

4. The method of claim 1, further including, responsive to the recognition hint, increasing a popularity score of the match, whereby the popularity score indicates that the match should be part of a core group of audio references.

5. The method of claim 1, wherein the recognition hint is an indication that the audio query is from an obscure reference.

6. The method of claim 5, further including, responsive to the recognition hint, matching the audio query against the expanded group of audio references that includes obscure references.

7. The method of claim 1, wherein:
   the recognition hint is a partial indication of what audio reference the audio query should match, including one or more of artist, composer, title, lyrics, or genre;
   further including using the partial indication of what reference the audio query should match when the retrying of the matching.

8. The method of claim 1, wherein the recognition hint is a sample of background noise.

9. The method of claim 1, wherein the recognition hint is an indication that the matching should be performed against a private group of audio references.

10. The method of claim 9, further including, responsive to the recognition hint, matching the audio query against a private group of audio references.

11. An article of manufacture including a non-transitory computer readable storage medium loaded with instructions that, when executed on a device, cause the device to carry out the actions of:
- receiving a follow-up query from a user that requests a retry at matching an initial audio query, the initial audio query comprising a recorded audio sample or audio fingerprints derived from the recorded audio sample, the follow-up query including:
  - the initial audio query previously submitted by the user or a reference to the initial audio query previously submitted by the user; and
  - a recognition hint from the user that suggests how to retry matching,
- queuing a retry request comprising the follow-up query after an initial audio query is not matched;
- processing the queued retry request from the queue based upon one of:
  - a period of time after which the initial audio query is not matched; or
  - the completion of an update of the expanded group of audio references;
- wherein processing the queued retry request includes retrying matching the initial audio query using the recognition hint and retrying matching resources that include an expanded group of audio references;
- identifying at least one match for the retry request and transmitting a report of the match; and
- storing data that correlates at least the follow-up query, the initial audio query or the reference to the initial audio query, and the match after retrying.

12. A device including a processor and memory, the memory loaded with instructions that, when executed on the device, cause the device to carry out the actions of:
- receiving a follow-up query from a user that requests a retry at matching an initial audio query, the initial audio query comprising a recorded audio sample or audio fingerprints derived from the recorded audio sample, the follow-up query including:
  - the initial audio query previously submitted by the user or a reference to the initial audio query previously submitted by the user; and
  - a recognition hint from the user that suggests how to retry matching,
- queuing a retry request comprising the follow-up query after an initial audio query is not matched;
- processing the queued retry request from the queue based upon one of:
  - a period of time after which the initial audio query is not matched; or
  - the completion of an update of the expanded group of audio references;
- wherein processing the queued retry request includes retrying matching the initial audio query using the recognition hint and retrying matching resources that include an expanded group of audio references;
- identifying at least one match for the retry request and transmitting a report of the match; and
- storing data that correlates at least the follow-up query, the initial audio query or the reference to the initial audio query, and the match after retrying.

\* \* \* \* \*